(12) United States Patent
Belchior et al.

(10) Patent No.: US 12,370,526 B2
(45) Date of Patent: Jul. 29, 2025

(54) PROCESS FOR PRODUCING NANOSTRUCTURED MATERIAL, PRODUCT AND USE

(71) Applicants: UNIVERSIDADE FEDERAL DE MINAS GERAIS, Belo Horizonte (BR); PETROLEO BRASILEIRO S.A.—PETROBRAS, Rio de Janeiro (BR); FUNDACAO DE AMPARO A PESQUISA DO ESTADO DE MINAS GERAIS—FAPEMIG, Belo Horizonte (BR); FCA FIAT CHRYSLER AUTOMOVEIS BRASIL LTDA, Betim (BR)

(72) Inventors: Jadson Claudio Belchior, Belo Horizonte (BR); Maria Helena Araujo, Belo Horizonte (BR); Flavia Cristina Camilo Moura, Belo Horizonte (BR); Sara Silveira Vieira, Belo Horizonte (BR); Mateus Carvalho Monteiro De Castro, Belo Horizonte (BR); Pedro Caffaro Vicentini, Rio de Janeiro (BR); Luciana Neves Loureiro, Rio de Janeiro (BR)

(73) Assignees: PETROLEO BRASILEIRO S.A.—PETROBRAS, Rio de Janeiro (BR); UNIVERSIDADE FEDERAL DE MINAS GERAIS, Belo Horizonte (BR)

( * ) Notice: Subject to any disclaimer, the term of this patent is extended or adjusted under 35 U.S.C. 154(b) by 1074 days.

(21) Appl. No.: 17/415,857

(22) PCT Filed: Dec. 19, 2019

(86) PCT No.: PCT/BR2019/050551
§ 371 (c)(1),
(2) Date: Sep. 24, 2021

(87) PCT Pub. No.: WO2020/124187
PCT Pub. Date: Jun. 25, 2020

(65) Prior Publication Data
US 2022/0062860 A1    Mar. 3, 2022

(30) Foreign Application Priority Data

Dec. 21, 2018 (BR) .......................... 1020180769090

(51) Int. Cl.
*B01J 20/30* (2006.01)
*B01D 53/14* (2006.01)
(Continued)

(52) U.S. Cl.
CPC .......... *B01J 20/3085* (2013.01); *B01D 53/14* (2013.01); *B01J 20/04* (2013.01); *B01J 20/20* (2013.01);
(Continued)

(58) Field of Classification Search
CPC ...... B01J 20/3085; B01J 20/20; B01J 20/265; B01J 20/3078; B01J 20/04; B01J 20/30;
(Continued)

(56) References Cited

U.S. PATENT DOCUMENTS 6,387,337 B1   5/2002   Pennline et al.
2017/0001170 A1   1/2017   Ghosh et al.

FOREIGN PATENT DOCUMENTS

CN   101492285 A * 7/2009
CN   102658023 A1   9/2012
(Continued)

OTHER PUBLICATIONS

Li et al., Hierarchical Nanocomposite by the Integration of Reduced Graphene Oxide and Amorphous Carbon with Ultrafine MgO Nanocrystallites for Enhanced CO2 Capture, 2017, Environmental Science & Technology, 51, 12998-13007 (Year: 2017).*
(Continued)

*Primary Examiner* — Coris Fung
*Assistant Examiner* — Tienna Marie Deroy
(74) *Attorney, Agent, or Firm* — RAPHAEL BELLUM PLLC

(57) ABSTRACT

The present invention describes a process for producing nanostructured material, produced from polymer waste doped with alkaline metals and/or alkaline earth metals,
(Continued)

which is capable of capturing and storing $CO_2$. The process for obtaining the material uses waste generated by the polymer industry and is therefore environmentally sustainable. The product produced, that is, the nanostructured material, shows high $CO_2$ absorption capacity, being able to absorb up to 80% by weight in mass in $CO_2$. In addition, the product produced shows low density, an important characteristic for application in vehicles. Therefore, the product obtained can be used for capturing and storing $CO_2$ emitted by different emission sources, mainly mobile sources such as vehicles, but can also be used in industries such as the mining industry, oil industry, inter alia, in addition to the automotive industry.

9 Claims, 3 Drawing Sheets

(51) Int. Cl.
  *B01J 20/04* (2006.01)
  *B01J 20/20* (2006.01)
  *B01J 20/26* (2006.01)
  *B01J 20/32* (2006.01)

(52) U.S. Cl.
  CPC ......... *B01J 20/265* (2013.01); *B01J 20/3078* (2013.01); *B01J 20/3204* (2013.01); *B01D 2253/25* (2013.01); *B01D 2257/504* (2013.01)

(58) Field of Classification Search
  CPC .............. B01D 53/14; B01D 2257/504; B01D 2253/102; B01D 53/02; Y02C 20/40
  See application file for complete search history.

(56) References Cited

FOREIGN PATENT DOCUMENTS

| | | | |
|---|---|---|---|
| CN | 106565757 A | * | 4/2017 |
| WO | 2014/210295 A2 | | 12/2014 |

OTHER PUBLICATIONS

CN106565757A_Machine_Translation_Decription_and_Claims (Year: 2017).*
CN-101492285-A_Machine_Translation_Description_and_Claims (Year: 2009).*
English translation of International Search Report in International Application No. PCT/BR2019/050551, dated Mar. 13, 2020.

* cited by examiner

PROCESS FOR PRODUCING NANOSTRUCTURED MATERIAL, PRODUCT AND USE

The present invention describes the process of obtaining nanostructured material produced from a polymeric residue doped with alkali and/or alkaline earth metals, which is capable of capturing and Storing $CO_2$. The process of obtaining the material utilizes residues generated by the polymer industry, being environmentally sustainable. The product obtained, that is, the nanostructured material, has high capacity of $CO_2$ absorption being capable of absorbing up to 80% of the mass of $CO_2$. In addition, it shows low density, and important characteristic for vehicle applications. Therefore, the product obtained can be used for capturing and storing $CO_2$ emitted by different emission sources, mainly mobile sources such as vehicles, but may also be used in industries such as mining, petroleum, among others in addition to automobile industry.

In an amendment to the Montreal Protocol, agreed on the Meeting held in Kigali (capital of Ruanda, East Asia) in 2016, the world nations agreed to decrease about 80% of the emissions from the HFCs (hydrofluorocarbons) gases. Since then, the search for new processes that decrease emissions from these gases has increased considerably. The combustion engines are responsible for the generation of much of the gases that cause greenhouse effect, mainly $CO_2$. During engine operation, the fuel is mixed with air and burned within the combustion chamber generating $CO_2$ and $H_2O$ and less NOx, and unburned fuel. In this regard, automobile manufacturers are seeking improvements to increase efficiency and reduce emissions of these gases by combustion engines. One of the currently most promising techniques for capturing carbon dioxide consists of the reversible reaction thereof with an inorganic solid. One of the limiting factors is the high temperature at which $CO_2$ is absorbed/desorbed as well as also the weight of the added material to reduce emission of gases. (Shengping Wang, Suli Yan, Xinbin Ma and Jinlong Gong. Recent advances in capture of carbon dioxide using alkyl-metal-based oxides. Energy Environ. Sci. 2011, 4, 3805)

Currently several materials have been used, with calcium-based ceramic materials having been given special attention due to their large potential for capturing $CO_2$ through the carbonation reaction. However, for mobile applications, such as vehicles, the calcium-based ceramic materials do not show satisfactory results, due to the high temperatures required for $CO_2$ absorption (around 500° C.) and its low absorption capacity relative to their mass. In this regard, the magnesium and beryllium based ceramic materials are more interesting because they show high $CO_2$ absorption capacity relative to their weight and the low temperatures at which carbonation reactions occur (around 100° C.) ([Yu, Fan, Ye Wu, Wenjing Zhang, TianyiCai, Yuhao Xu and Xiaoping Chen. A Novel Aerogel Sodium-Based Sorbent For Low Temperature $CO_2$ Capture. Greenhouse Gases: Science and Technology, 2012); (Gao, Wanlin, Tuantuan Zhou, Benoit Louis e Qiang Wang. Hydrothermal Fabrication of High Specific Surface Area Mesoporous MgO with Excellent $CO_2$ Adsorption Potential at Intermediate Temperatures. Catalysts, 2017); (Harada, Takuya, and T. Alan Hatton. Colloidal Nanoclusters of MgO Coated with Alkali Metal Nitrates/Nitrites For Rapid, High Capacity $CO_2$ Capture at Moderate Temperature. Chemistry of Materials, 2015), To show the relevance of the process and the complexity of absorbing acid gases produced in combustion systems, various patent documents and articles have been found in the prior art.

The large scale application of carbon dioxide absorption processes has been shown by U.S. Pat. No. 5,087,597 (Orlando, L. et al. Carbon dioxide adsorbent and method for producing the adsorbent, 1992) with the description of a polyalkoxysilane-, silica-, alumina- and iron oxide-based mixture, which is employed in the absorption of $CO_2$ present in containers for transporting materials susceptible to decomposition by acid environment or for transporting animals.

BR 0003340 document describes the preparation of a mixture comprised of magnesium oxide and an alkali metal carbonate (Mayorga, S. G. et al. "Adsorventes de dióxido de carbono contendo óxido de magnésio adequado para uso sob altas temperaturas e processo de sua fabricação", 2000). This mixture absorbs $CO_2$ in a temperature range between 300° C. and 550° C.

Patent document RU2015122375 (A), of 2017, entitled "Method of producing chemical carbon dioxide absorber" refers to the production of chemical absorber of carbon dioxide used in individual breathing apparatus. The method of production of chemical absorber of carbon dioxide consists of preparing a suspension of alkali and/or alkaline earth metal hydroxides dissolving in water alkali metal hydroxides with subsequent addition of hydroxides of alkali and/or alkaline earth metals.

Patent document US20030232722 (A1), of 2002, entitled "Carbon dioxide gas absorbent, method for manufacturing the carbon dioxide gas absorbent and method of regenerating the carbon dioxide gas absorbent", describes a technology that provides absorption of carbon dioxide gas through a material containing at least one compound selected from the group of sodium silicate, potassium silicate and lithium silicate.

The article entitled "Colloidal Nanoclusters of MgO Coated with Alkali Metal Nitrates/Nitrites for Rapid, High Capacity $CO_2$ Capture at Moderate Temperature", describes the use of MgO nanoclusters for $CO_2$ absorption, being prepared by a non-hydrolytic sol-gel reaction in a non-aqueous solvent with high boiling point in the presence of two types of surfactants (oleic acid and oleylamine), with subsequent calcination in a methanol solution for the removal of the surfactant, later impregnated with alkali metals and mixed with [$LiNO_3$]: [$NaNO_3$]: [$KNO_3$] solutions in the molar ratio of 0.30:0.18:0.52. After obtaining a well dispersed colloidal suspension, the solvent was evaporated so that the alkali metal salts settled on the surface of the MgO nanoclusters. The results show that $CO_2$ absorption is greater than 11.7 mmol/g (514.8 mg $CO_2$ per 1 g adsorbent) in 30 min. in the presence of $CO_2$, 100% dry under ambient pressure (1 bar) at 340° C. and reached 15.7 mmol/g (690.8 mg $CO_2$ per 1 g adsorbent) in 4 h The nanoclusters allowed an increase in the active surface area of MgO coated with thin layers of alkali metal salts and enabled the rapid conversion of MgO into $MgCO_3$. The results also indicate that the regeneration of the material can be improved due to the introduction of the salts through the formation of nitro or magnesium nitrate species, which increased the critical thickness of the product layers and attenuated the degradation of nanoclusters over the repeated sorption/desorption cycles (Harada, Takuya, and T. Alan Hatton. "Colloidal Nanoclusters of MgO Coated with Alkali Metal Nitrates/Nitrites for Rapid, High Capacity $CO_2$ Capture at Moderate Temperature." Chemistry of Materials, 2015).

Another article that evaluates the production of porous magnesium oxide (MgO) by the hydrothermal method for $CO_2$ capture/absorption, entitled "Hydrothermal Fabrication of High Specific Surface Area Mesoporous MgO with Excellent $CO_2$ Adsorption Potential at Intermediate Temperatures", describes the synthesis of the material involving the use of sodium dodecyl sulfate (SDS). The samples were prepared by assisted precipitation by hydrolysis of urea and magnesium hydroxide from aqueous solution of magnesium nitrate, followed by thermal decomposition of the precipitated magnesium hydroxide. The powder obtained after synthesis and oven drying was calcined at 400° C. for 5 h in an air atmosphere. The MgO compound obtained from the introduction of the SDS was produced in sheet-like format with a disordered layer structure. This adsorbent showed an excellent capacity for $CO_2$ capture of 0.96 mmol/g at moderate temperatures (300° C.). This mesoporous material also exhibited high stability during multiple $CO_2$ adsorption/desorption cycles (over 15 cycles). This high capacity to capture $CO_2$ is related to its high specific surface area of 3,213 $m^2/g$. This work has suggested a new synthesis for MgO-based $CO_2$ adsorbents at intermediate temperatures (Gao, Wanlin, TuantuanZhou, Benoit Louis, and Qiang Wang. Hydrothermal Fabrication of High Specific Surface Area Mesoporous MgO with Excellent $CO_2$ Adsorption Potential at Intermediate Temperatures. Catalysts, 2017).

The article entitled "A Novel Aerogel Sodium-Based Sorbent for Low Temperature $CO_2$ Capture" describes a novel sorbent (NaN) based on sodium and synthesized using $Na_2CO_3$, aminopropyl-triethoxysilane (APTES) and tetraethylortho-silicate (TEOS) by sol-gel method (prepared in the following molar ratio $Na_2CO_3$: APTES: TEOS: 0.5:0.5:1 or 1:1:1 or 2:2:1). The $CO_2$ sorption capacity was evaluated using a fixed bed reactor. The results showed that the SCFD-NaN (1:1:1) reached the greatest $CO_2$ sorption capacity (2.51 mmol/g) in the best experimental conditions (50° C., $H_2O/CO_2$=1:1). In addition, the NaN material was regenerable and stable during the 10 cyclic operations (Yu, Fan, Ye Wu, Wenjing Zhang, TianyiCai, Yuhao Xu, and Xiaoping Chen. A Novel Aerogel Sodium-Based Sorbent for Low Temperature $CO_2$ Capture. Greenhouse Gases: Science and Technology, 2012).

The article entitled "Double Sodium Salt-Promoted Mesoporous MgO Sorbent with High $CO_2$ Sorption Capacity at Intermediate Temperatures under Dry and Wet Conditions", describes the production of mesoporous $MgO/Na_2CO_3/NaNO_3$ composites using supercritical drying. The molar ratio of was 1: x: 0.2 (with x=0.05; 0.1; 0.2; 0.4 and 0.6). The sorption capacity was 56.0 wt % at 325° C. for pure $CO_2$. The $CO_2$ sorption mechanism was dominated by the formation of $MgCO_3$ and $Na_2Mg(CO_3)_2$ with $Na_2CO_3$ functioning as a $CO_2$ carrier, while $NaNO_3$ functioned as a reaction promoter. Reaction cycles were evaluated and, after 14 cycles the sorption capacity was 31.8 wt % at 325° C. (Vu, AnhTuan, Keon Ho, Seongmin Jin, and Chang Ha Lee. Double Sodium Salt-Promoted Mesoporous MgO Sorbent with High $CO_2$ Sorption Capacity at Intermediate Temperatures under Dry and Wet Conditions. Chemical Engineering Journal, 2016.

ZHENISOVA et al. studied magnesium and calcium based solids for capturing $CO_2$ through hydrotalcites (Mg/Al ratio equal to 2) being prepared by the high saturation method with addition of a solution of $Mg(NO_3)_2.6H_2O$ to a solution of $Al(NO_3)_3.9H_2O$. The samples were filtered, washed, dried and calcined at 450° C. With the intention of increasing the basicity of the hydrotalcite and consequently improving the absorption of $CO_2$, $K_2CO_3$ (promoter) was impregnated into the produced materials. The $CO_2$ absorption capacity at 350° C. was 0.43 mol/kg for the potassium-free magnesium hydrotalcite (SMgOK). Hydrotalcites with 20 wt % $K_2CO_3$ have shown increased $CO_2$ absorption capacity (1.14 mol/kg). The material exhibited high sorption capacity and capacity for five cycles (Zhenissova, Akbota, Francesca Micheli, Leucio Rossi, Stefano Stendardo, Pier Ugo Foscolo, and Katia Gallucci. Experimental Evaluation of Mg- and Ca-Based Synthetic Sorbents for $CO_2$ Capture. Chemical Engineering Research and Design, 2014).

The article entitled "Mesoporous MgO Sorbent Promoted with $KNO_3$ for $CO_2$ Capture at Intermediate Temperatures", describes the production of mesoporous composites of the type $MgO/KNO_3$ using a $CO_2$ sorption aerogel method, in 1:0.2 molar ratio, showing a $CO_2$ absorption result of about 13.9 wt % at 325° C., a capacity seven times greater than the pure MgO. In addition, the $MgO/KNO_3$ compound showed higher sorption capacity than other MgO composites promoted by other alkali metal salts ($K_2CO_3$, KOH, $NaNO_3$, $Na_2CO_3$, $NazHPO_4$, $LiNO_3$ and $Li_2CO_3$) (Vu, AnhTuan, Yongha Park, PilRipJeon, and Chang Ha Lee. Mesoporous MgO Sorbent Promoted with $KNO_3$ for $CO_2$ Capture at Intermediate Temperatures. Chemical Engineering Journal, 2014).

DONG et al. developed a $Na_2CO_3/MgO/Al_2O_3$ type system that was evaluated as a $CO_2$ trap. The main objective was to investigate techniques to improve the $CO_2$ absorption rate adding MgO to $Na_2CO_3/Al_2O_3$. Materials containing different fillers (1.5 and 10% by mass) of MgO were prepared, and their carbonation characteristics, microstructure and physical properties were investigated. The preparation process consisted of three steps: mixing, impregnation and drying at 378K for dehydration, followed by calcination at 573K. The amount of $Na_2CO_3$ used was 25%. For MgO the masses used were 1.5 and 10 wt %. The remainder of the material was the support, $Al_2O_3$. In the first 10 minutes of reaction the sorption capacity was approximately 31% for the $Na_2CO_3/MgO/Al_2O_3$ with 5% MgO. This solid was stable for 14 use (Dong, Wei, Xiaoping Chen, FanYu, and Ye Wu. $Na_2CO_3/MgO/Al_2O_3$ Solid Sorbents for Low-Temperature $CO_2$ Capture. Energy & Fuels, 2015).

The article entitled "Roles of Double Salt Formation and $NaNO_3$ in $Na_2CO_3$-Promoted MgO Absorbent for Intermediate Temperature $CO_2$ Removal" deals with a study of absorption and desorption of carbon dioxide in $MgO/Na_2CO_3$, at temperatures from 300 to 470° C. The materials were synthesized by forming and activating the precipitate resulting from the addition of sodium carbonate to an aqueous solution of magnesium nitrate. Absorption tests indicate that the absorbent has the capacity to absorb 15% by weight (3.4 mmol $CO_2$/g absorbent) and can be easily regenerated (Zhang, Keling, Xiaohong S. Li, YuhuaDuan, David L. King, Prabhakar Singh, and Liyu Li. Roles of Double Salt Formation and $NaNO_3$ in $Na_2CO_3$-Promoted MgO Absorbent for Intermediate Temperature $CO_2$ Removal. International Journal of Greenhouse Gas Control, 2013).

The present invention describes a process for obtaining nanostructured material produced from polymeric residues generated by the polymer industry with alkali and alkaline earth metals, which is capable of capturing and storing $CO_2$ through a chemical reaction with the material. The obtained material comprises a carbonaceous support containing calcium, magnesium or magnesium/sodium or magnesium/sodium/beryllium nanoparticles. In addition to the large $CO_2$ absorption capacity, this hybrid material has low density, important characteristic for mobile applications. In addition, it allows efficient capturing of $CO_2$ at low temperatures.

Thus, the present invention is intended to solve problems involving the capture and storage of $CO_2$ emitted by different emission sources, primarily mobile sources such as vehicles, but may also be used in industries such as mining, petroleum and automobile.

DETAILED DESCRIPTION OF THE INVENTION

Figure 1:
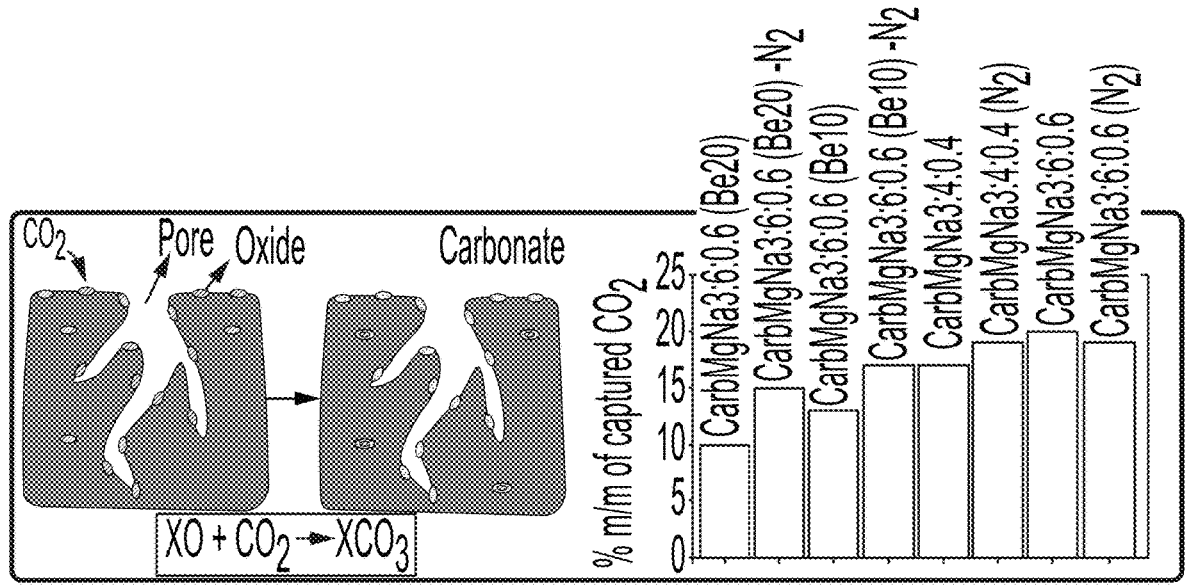
FIG. 1 depicts the material produced and the percentage of $CO_2$ produced by prepared samples

The present invention describes the process of obtaining nanostructured material, produced from a polymeric residue doped with alkali and alkaline earth metals, that is capable of capturing and storing $CO_2$. The process of obtaining the material utilizes residues generated by the polymer industry, being environmentally sustainable. The product obtained, that is, the nanostructured material, has low density and high $CO_2$ absorption capacity, and can absorb up to 80% of the mass weight of $CO_2$.

The proposed process for obtaining nanostructured material comprises the following steps of:
a. solubilizing the metal hydroxide with purity between 95 and 99.99% in acetyl acetone with purity between 97 and 99%, in the ratio of 0.5 to 5 parts of metal hydroxide to a part of acetyl acetone being preferably in the 1:1 ratio;
b. stirring for 15 to 20 minutes;
c. transferring the solution obtained in step b to an oven at a temperature of from 90° C. to 120° C., preferably 105° C. for a period of 18 to 36 hours, until the material remains with the mass constant forming the metal acetylacetonate (X(acac)n);
d. transferring the compound obtained in step c) to polystyrene dissolved in organic solvent, preferably in the ratio of 1 g of the compound obtained in step "c" in 20 mL of the organic solvent;
e. transferring the compound obtained in step "d" into a reactor and pressurizing in an inert atmosphere between 5 and 15 bar;
f. heating the reactor with a heating rate of 5° C. to 10° C./$min^{-1}$ to a temperature in the range of 500° C. to 600° C., preferably 530° C.; and maintaining at that temperature for a period of 3 to 8 hours;
g. cooling the system to a temperature of 20° C. to 30° C.

In step "a", the metal hydroxide is selected from the group comprising the alkali and/or alkaline earth metals.

In step "c", the metal acetylacetonate (X(acac)n) is selected from the group comprising calcium, magnesium, sodium and beryllium acetylacetonate, wherein X is Ca, Mg, Na or Be, respectively, and n is 1 or 2.

In step "d", the organic solvent used to dissolve the polystyrene is preferably ethyl acetate or acetone.

In step "e", the inert atmosphere is characterized by containing preferably nitrogen or argon.

The nanostructured material of present invention comprises a mesoporous material and alkali and/or alkaline earth metals.

The mesoporous support may be impregnated with soluble and calcined calcium, magnesium, sodium or beryllium salts.

The support may be based on carbon (activated or not) can be obtained from any source of carbon (alcohols, sugars, cellulose, aliphatic and aromatic hydrocarbons), impregnated or doped with calcium, magnesium, sodium or beryllium.

The mesoporous support can be impregnated or doped with alkali and/or alkaline earth metals.

The nanostructured material comprising mesoporous material and alkali and/or alkaline earth metals can be used for absorption of $CO_2$ at temperatures between 100 and 600° C.

The present invention may be better understood by the following examples, not limiting the technology.

EXAMPLE 1. Obtaining the Carbon-Based Nanostructured Material and Alkali and/or Alkaline Earth Metals Ca, Mg, Na and/or Be doped hybrid materials were prepared from co-pyrolysis of the complexes of magnesium, sodium or beryllium (X(acac)n acetylacetonate, where X can be Ca, Mg, Na and Be and n=1 or 2) with a carbon source, where a polystyrene residue (PS) at 530° C. for 5 hours at 10 bar of inert atmosphere ($N_2$ Or Ar) was used. For such, the PS and the Ca, Mg, Na, and/or Be acetylacetonate (acac) complexes were mixed and dissolved in an organic solvent, such as acetone or ethyl acetate, (not limiting, as the type of solvent used to dissolve polystyrene does not interfere with the process) and then poured into a stainless steel reactor where the mixture was then pyrolyzed. The obtained material can be used directly in the absorption of $CO_2$ or shaped into monoliths using an extruder, or with a commercial binder, for example, 10% by weight carboxymethyl cellulose.

The Ca, Mg, Na and/or Be doped hybrid materials prepared from co-pyrolysis of the complexes of magnesium, sodium or beryllium acetylacetonate with a carbon source, a polystyrene residue (PS) can be obtained using different atomic or molar ratios of the four basic components in the co-pyrolysis as shown in Table 1

TABLE 1

Different mass or molar ratios used in co-pyrolysis

| Component | OS | Ca(acac)$_2$ | Mg(acac)$_2$ | Na(acac) | Be(acac)$_2$ |
|---|---|---|---|---|---|
| Percentage (m/m) | 5%-40% | 30%-80% | 30%-80% | 3%-10% | 5%-30% |

The carbon source may also be replaced by any carbon-containing, polymeric or not such as, for example, thermoplastics, bitumen, petroleum refining residues, among others.

The metal complex used as a source of Ca, Mg, Na and Be can also be with different ligands since they are soluble in organic solvents or partially soluble solvents. FIG. 1 shows a schematic of preparing the materials with some data of the amount of $CO_2$ captured. The advantage of these samples is at the temperature used to capture $CO_2$ that is close to 100° C. while the samples containing only calcium need temperatures greater than 500° C. to store $CO_2$.

EXAMPLE 2—$CO_2$ Capture Assays and Characterization of the Materials Obtained

For $CO_2$ capture assays, the obtained materials were transferred to a reaction system comprised of a glass reactor and held under heating (at 130° C. preferably, this temperature can be varied from 100 to 150° C.). The reactor was connected to the gas inlet. The reaction proceeded for 12 hours (which can vary from 3-15 hours) under $CO_2$ flow at 50 mL min$^{-1}$ (and can vary from 30 to 80 mL min$^{-1}$). At the end of the reaction the material was dried in an oven at 80° C. (which can be 60-100° C.) and analyzed.

The assays show that the Carb Mg3:6 and Carb Mg3:1,2 material captures less than 5% $CO_2$. However, the addition of sodium causes this percentage to be close to 20% as the data shown in Table 2.

Figure 2:
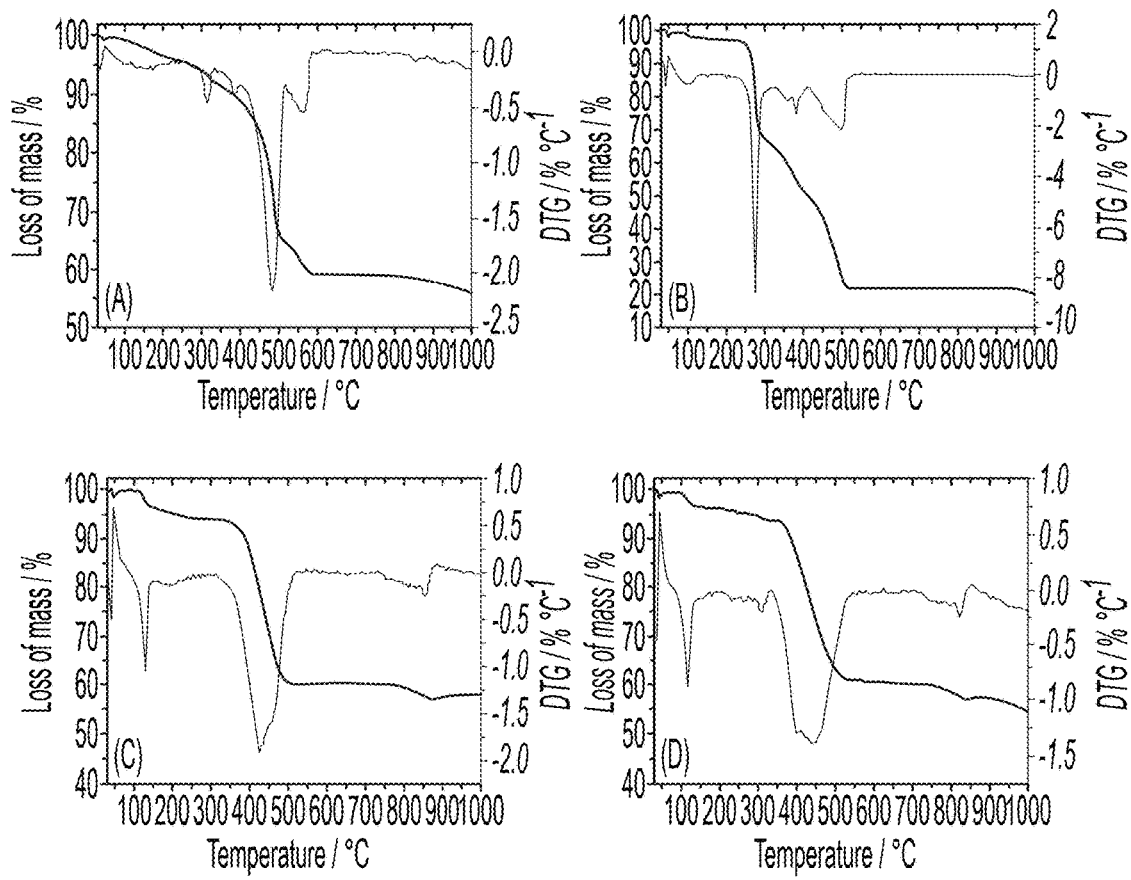
FIG. 2 depicts the profile of mass loss of some of the materials developed. The thermal analysis of magnesium acetylacetonate (A) and sodium acetylacetonate (B) shows that the profile of mass loss is different from the materials CarbMgNa 3:6 (C) and CarbMgNa (Be10) (D) materials.

Physical-chemical characterizations indicate that the material is composed of approximately 60% carbon according to thermal analysis data noted in FIG. 2. The thermal analysis of magnesium Acac (A) and sodium Acac (B) shows that the profile of mass loss is different from materials (CarbMgNa 3:6-0,6 (C) and Carb MgNa (Be10) (D)). This indicates that carbonaceous structures are not equal and that an interaction between the polystyrene and the acac (M) occurred thus leading to the formation of carbonaceous structures doped with the metals. According to the profile of mass loss it is possible to say that there is about 42% magnesium and sodium oxide in the CarbMgNa3: 6-0.6 (C) sample and about 45% magnesium, sodium, and beryllium oxide in the CarbMgNa3: 6:0.6 (Be10) (D) sample.

Figure 3:
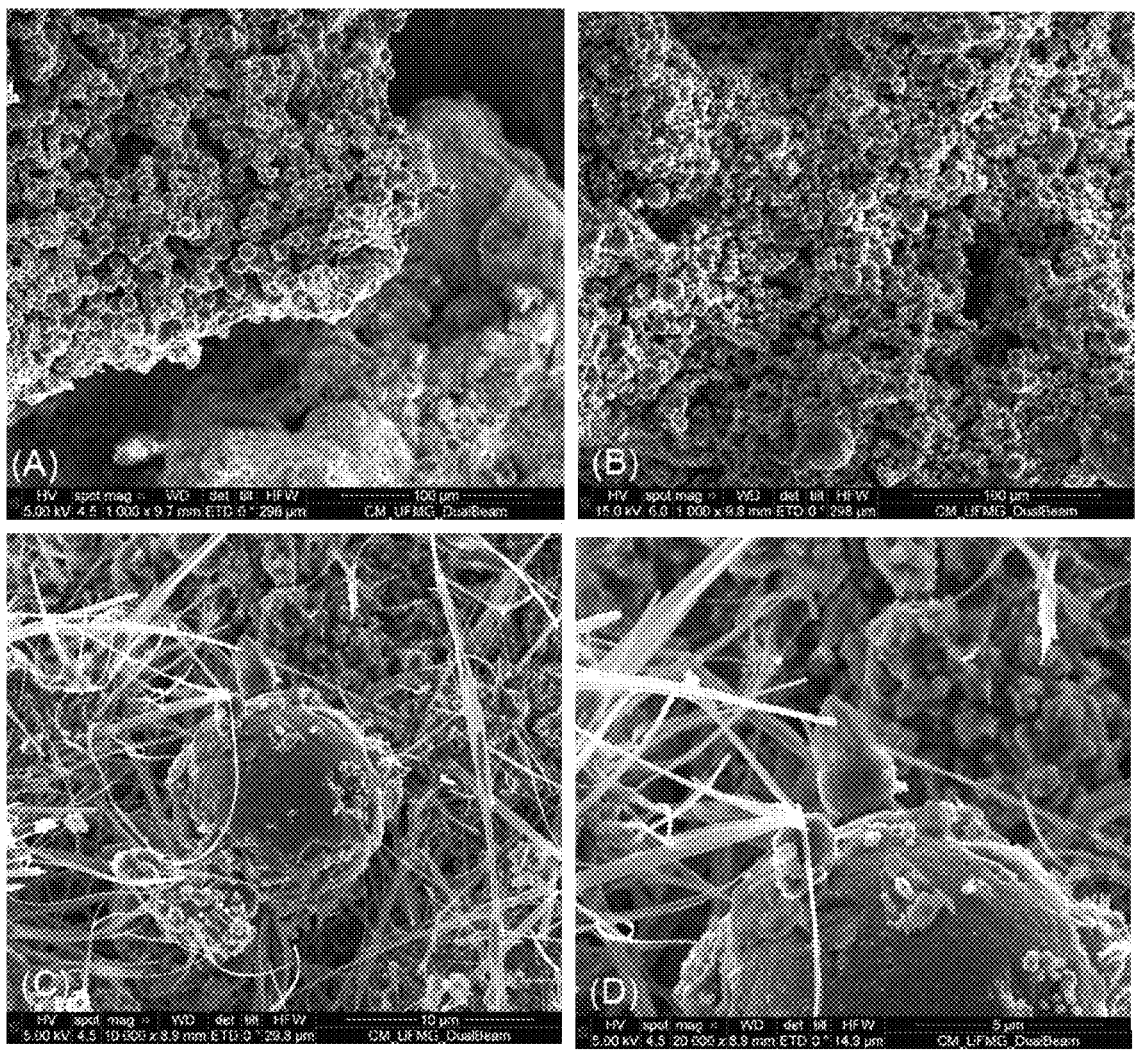
FIG. 3 depicts images of Scanning Electron Microscopy (SEM) of the products obtained. The structure of some materials CarbMgNa 3:2-0.2 (A), CarbMgNa 3:6-0.6 (B), showing small spheres, using 1,000-fold magnification, and the sample prepared with beryllium (CarbMgNa3: 6:0.6 (Be10)) (C) showing the presence of needles using 10,000-fold magnification. FIG. (D) also of the CarbMgNa3: 6:0.6 (Be10) sample, was magnified 20,000 times and shows the same profile.

Scanning Electron Microscopy (SEM) assays were performed, as shown in FIG. 3, which show a surface composed of irregular particles comprised mainly of needles and spheres. The structure of CarbMgNa 3:2-0.2 (A) and CarbMgNa 3:6-0.6 (B) show small spheres, which are more organized in sample (A), probably due to the lesser amount of metal present in the carbonaceous structure. In the sample prepared with beryllium (CarbMgNa3: 6:0.6 (Be10)) (C) and (D) it is possible to observe the presence of needles that are likely due to the presence of this metal in the structure.

Figure 4:
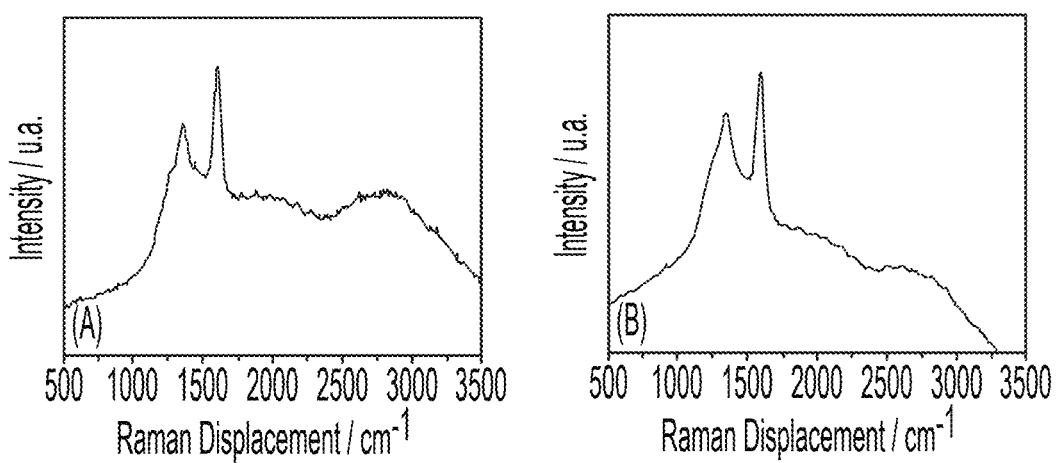
FIG. 4 shows some Raman Spectroscopy data. The spectra obtained in the graphs (A) and (B) showed the presence of a band near 1,570 $cm^{-1}$, typical of more organized carbon and a band at 1,350 $cm^{-1}$, which suggests the presence of more defective amorphous carbon structures.

Raman Spectroscopy (FIG. 4) assays were conducted to characterize the nature of the carbon present in the samples. The spectra obtained showed the presence of a band near 1,570 cm$^{-1}$ (G band related to the carbon-carbon bond of sp$^3$ type) typical of more organized carbon and a band of 1,350 cm$^{-1}$ (D band typical for sp2 carbon-carbon), which suggests the presence of more defective amorphous carbon structures. The degree of organization of the structures was related to the intensity of those bands. The IG/ID ratio (G-Band Intensity/D-Band Intensity) was 1.08 for the CarbMgNa 3:6-0.6 (A) and 1.15 for CarbMgNa3: 6:0.6 (Be10) (B). This indicates that the structures are similar in relation to the degree of organization and that the presence of the beryllium does not interfere with this property.

Figure 5:
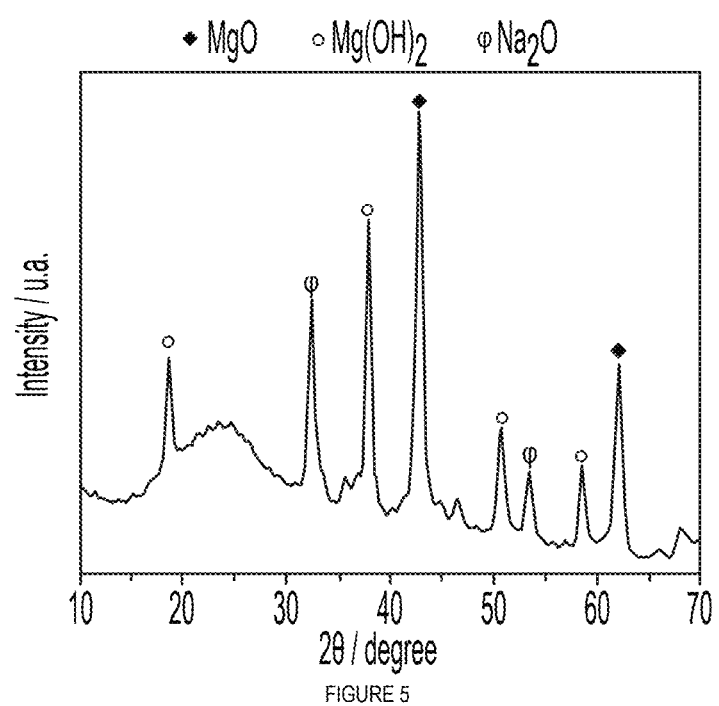
FIG. 5 shows the X-Ray Diffractograms of the sample of CarbMgNa3: 6:0.6. This structure is mainly comprised of MgO, $Mg(OH)_2$ and $Na_2O$.

X-ray diffraction analyses of sample CarbMgNa3:6:0.6, shown in FIG. 5 were performed. This structure is mainly comprised of MgO (JCDPS-75-447), Mg(OH)$_2$ (JCDPS-44-1482) and Na$_2$O (JCDPS-77-2148).

TABLE 2

Amount of $CO_2$ captured by some materials.

| Material | $CO_2$ captured (%) |
|---|---|
| Carb Mg 3:6 | 3.5 |
| Carb Mg 3:1.2 | 2.6 |
| Carb MgNa 3:4-0.4 | 17 |
| Carb MgNa 3:6-0.6 | 21 |
| Carb MgNa (Be10) | 17 |
| Carb MgNa (Be20) | 13 |

The invention claimed is:

1. A process of making a nanostructured material, comprising the following steps:
   (a) preparing a solution by solubilizing a metal hydroxide with a purity of 95 to 99.99% in acetyl acetone with a purity of 97 to 99%, in a ratio of 0.5 to 5 parts of metal hydroxide to 1 part of acetyl acetone;
   (b) stirring the solution prepared in step (a) for 15 to 20 minutes;
   (c) transferring the solution obtained in step (b) to an oven at a temperature of from 90° C. to 120° C. for a period of 18 to 36 hours, until a compound remains with mass constant forming a metal acetylacetonate (X(acac)n);
   (d) transferring the compound obtained in step (c) to a polystyrene dissolved in an organic solvent;
   (e) transferring the compound obtained in step (d) to a reactor and pressurizing the reactor to an inert atmosphere from 5 to 15 bar;
   (f) heating the reactor at a rate of 5° C. to 10° C. min$^{-1}$ to a temperature of 500° C. to 600° C. and maintaining at that temperature for a period of 3 to 8 hours;
   (g) cooling the reactor to a temperature of 20° C. to 30° C.

2. The process of making a nanostructured material of claim 1, wherein the metal hydroxide in step (a) is selected from the group comprising alkali and/or alkaline earth metals.

3. The process of making a nanostructured material of claim 1, wherein the metal acetylacetonate (X(acac)n) in step (c) is selected from the group comprising calcium, magnesium, sodium and beryllium acetylacetonate, where X is Ca, Mg, Na or Be, respectively, and n is 1 or 2.

4. The process of making a nanostructured material of claim 1, wherein the organic solvent in step (d) is ethyl acetate or acetone.

5. The process of making a nanostructured material of claim 1, wherein the inert atmosphere in step (e) comprises nitrogen or argon.

6. The process of making a nanostructured material of claim 1, wherein the ratio of the metal hydroxide to acetyl acetone in step (a) is 1:1.

7. The process of making a nanostructured material of claim 1, wherein the oven temperature in step (c) is 105° C.

8. The process of making a nanostructured material of claim 1, wherein, in step (d), the compound obtained in step (c) is transferred to the polystyrene dissolved in the organic solvent in the proportion of 1 g of the compound obtained in step (c) in 20 ml of organic solvent.

9. The process of making a nanostructured material of claim 1, wherein the reactor in step (f) is heated to a temperature of 530° C.

* * * * *